(12) United States Patent
Vallejo Díaz et al.

(10) Patent No.: US 11,415,506 B2
(45) Date of Patent: Aug. 16, 2022

(54) IN VITRO METHOD FOR SUN PROTECTION FACTOR DETERMINATION

(71) Applicant: UNIVERSIDAD NACIONAL DE COLOMBIA, Bogotá (CO)

(72) Inventors: Bibiana Margarita Rosa Vallejo Díaz, Bogotá (CO); Clara Eugenia Plazas Bonilla, Bogotá (CO); Helber De Jesús Barbosa Barbosa, Bogotá (CO); Nestor Jaime Torres Salcedo, Bogotá (CO); Angie Viviana Vitola Domínguez, Bogotá (CO); Aura Rocío Hernández Camargo, Bogotá (CO)

(73) Assignee: UNIVERSIDAD NACIONAL DE COLOMBIA, Bogota (CO)

( * ) Notice: Subject to any disclaimer, the term of this patent is extended or adjusted under 35 U.S.C. 154(b) by 58 days.

(21) Appl. No.: 16/634,145

(22) PCT Filed: Jul. 25, 2018

(86) PCT No.: PCT/IB2018/055545
§ 371 (c)(1),
(2) Date: Aug. 25, 2020

(87) PCT Pub. No.: WO2019/021205
PCT Pub. Date: Jan. 31, 2019

(65) Prior Publication Data
US 2020/0386674 A1 Dec. 10, 2020

(30) Foreign Application Priority Data
Jul. 25, 2017 (CO) .............................. 20170007374

(51) Int. Cl.
*G06F 17/40* (2006.01)
*G01N 21/33* (2006.01)
(Continued)

(52) U.S. Cl.
CPC ............. *G01N 21/33* (2013.01); *G01N 21/77* (2013.01); *G01N 2021/1761* (2013.01); *G01N 2021/755* (2013.01); *G01N 2021/7783* (2013.01)

(58) Field of Classification Search
CPC ........... G01N 21/77; G01N 2021/1761; G01N 2021/755; G01N 21/75
See application file for complete search history.

(56) References Cited

U.S. PATENT DOCUMENTS

| | | | | |
|---|---|---|---|---|
| 5,116,615 A | * | 5/1992 | Gokcen | A61K 38/47 424/94.2 |
| 9,173,830 B1 | * | 11/2015 | Fanizza | A61K 8/0241 |
| 2020/0172849 A1 | * | 6/2020 | Takemura | C12M 1/00 |

OTHER PUBLICATIONS

Sohn M, Malburet C, Baptiste L, Prigl Y. Development of a Synthetic Substrate for the in vitro Performance Testing of Sunscreens. Skin Pharmacol Physiol. 2017;30(3):159-170. doi: 10.1159/000464471. Epub May 24, 2017. PMID: 28535540. (Year: 2017).*

* cited by examiner

*Primary Examiner* — Rebecca C Bryant
(74) *Attorney, Agent, or Firm* — Isaac A Angres

(57) ABSTRACT

The invention provides an in vitro method for the determination of sun protection factor (SPF), in order to gain reproducibility and accuracy and replace the use of tests on living beings. Natural substrates of the human skin, like hyaluronic acid are tested in the form of solutions or in the form of a solid film in a modified spectrophotometer, at concentrations below 1% w/v. Once calibrated, the method is used to corroborate the protection factor offered by commercial sunscreens.

9 Claims, 5 Drawing Sheets

(51) Int. Cl.
*G01N 21/77* (2006.01)
*G01N 21/17* (2006.01)
*G01N 21/75* (2006.01)

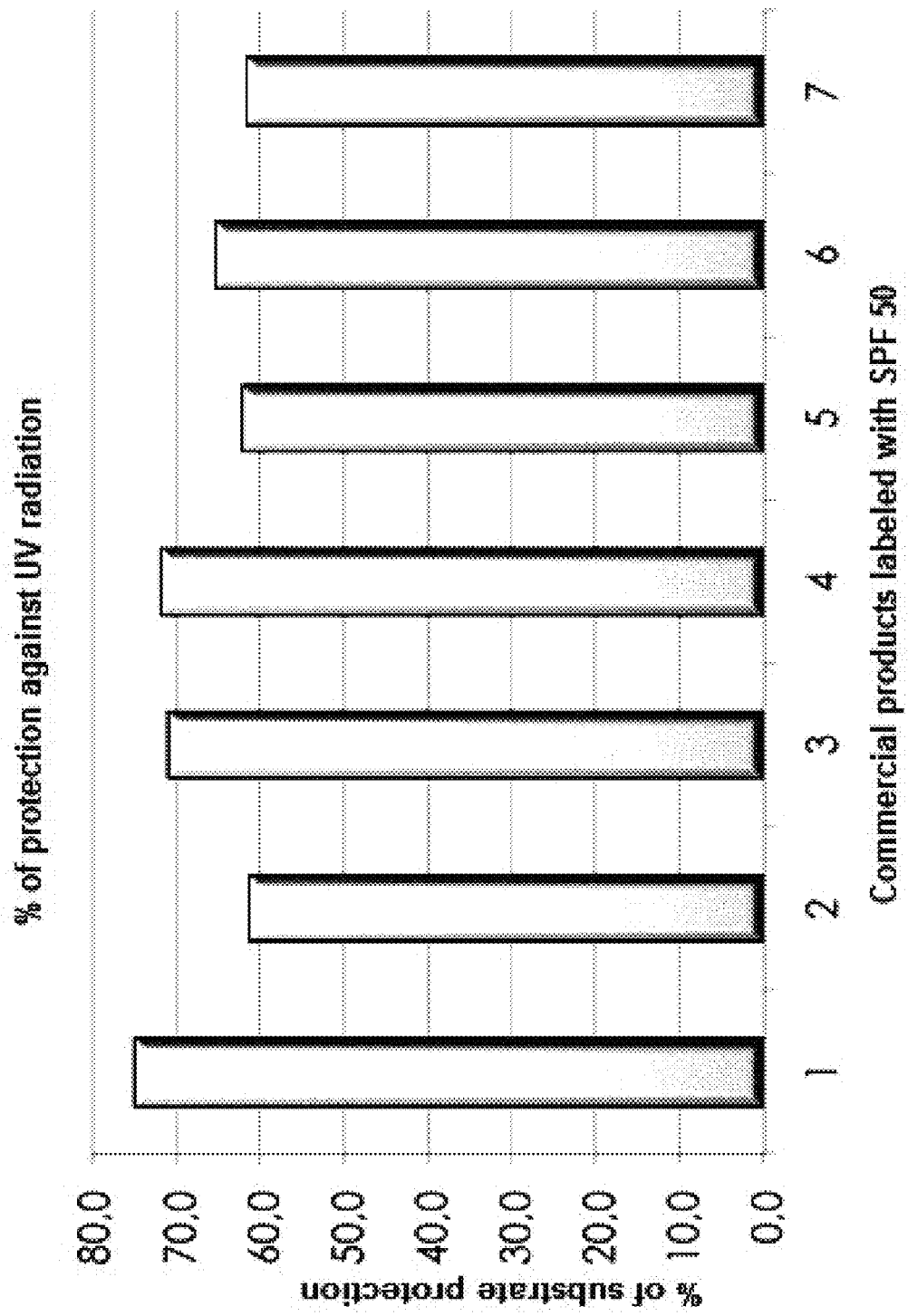

IN VITRO METHOD FOR SUN PROTECTION FACTOR DETERMINATION

This application is a 371 application of International Application No. PCT/IB2018/055545 filed Jul. 25, 2018; (published on Jan. 31, 2019 as WO/2019/021205) titled "Method For Determining Sun Protection Factor In Vitro"; the entire contents of which are hereby incorporated by reference herewith. This application also claims priority to Colombian Application No. CO20170007374 filed Jul. 25, 2017.

FIELD OF THE INVENTION

The invention relates to methods for the determination of the Sun Protection Factor (SPF), by in vitro techniques; specifically refers to a method that makes use of hyaluronic acid to endorse the percentage of protection against UV radiation offered by sunscreens.

BACKGROUND OF THE INVENTION

The sun is the main source of UV radiation to which the skin is exposed and, depending on the frequency of exposure, causes harmful effects on health, such as cutaneous erythema (sunburn). In the long term, this may result in premature aging, dermatitis and, in the most severe cases, leads to the formation of skin cancer.

The skin is the most extensive organ of the human body and has multiple functions such as: the regulation of body temperature, the protection of the organism from external agents, such as ultraviolet (UV) radiation. This organ is constituted by the superposition of three tissues of different structure with very specific functions. From the outside to the inside they are: the epidermis or epithelium; the dermis or connective tissue, consisting mainly of fibroblasts that produce proteins such as collagen and hyaluronic acid; and the hypodermis: connective adipose tissue, which constitutes the subcutaneous tissue (Bailón and Chiadmi, 2007).

Within a broad list of skin constituents that have been studied and reacting to UV radiation, hyaluronic acid (HA) stands out, showing a high sensitivity to UVA-UVB radiation dependent on exposure time, and its degradation has been associated with premature aging of the skin (Naylor, 2011).

The research carried out pointed out besides hyaluronic acid, other components sensitive to ultraviolet radiation such as cholesterol, collagen and elastin, in which the main quantified effects are related to the degradation phenomena of some chromophore groups of its structures and loss of crosslinking or compaction of its fibers as a consequence of the time and intensity of exposure to UV radiation. Thus, it has been established that each of these constituents of the skin are affected by UV radiation in a cumulative, quantifiable manner and whose affectation is directly related to the deleterious effects on health.

On cholesterol, for example, important in shaping the barrier responsible for skin permeability and water exchange, it was established that radiation causes a cumulative degradation evidenced by the decrease in its concentration as a function of time of exposure, quantified by spectrophotometry and gas chromatography coupled to masses.

As for collagen, a protein structure widely distributed in the skin that provides mechanical integrity, it was established by quantification by hydroxyproline that it is highly sensitive to UV radiation, producing degradation and, in turn, fiber rupture evidenced histologically in tissue ex vivo.

Similarly elastin, another protein present in the skin whose structural function is to give elasticity, is crisscrossed with collagen fibers and is also susceptible to UV radiation presenting rupture in its structure, observed histologically in ex vivo tissue and through the degradation of aqueous dispersions quantified by spectrophotometry.

On the other hand, the development of effective products that avoid the damage caused by overexposure to sunlight has become a constant challenge in recent times; These sunscreens consist of formulations based on compounds, either organic or inorganic, that act as filters and that through various mechanisms such as absorption, reflection or dispersion of light, prevent ultraviolet radiation from causing deleterious effects on the structures of the skin (Schalka and Silva, 2011).

To date, the only methodology accepted by the global regulatory agencies for the determination of the Sun Protection Factor SPF is the "in vivo" assay by clinical studies with healthy volunteers whose skin is directly reached by ultraviolet rays in order to establish the degree of protection provided by the product against erythema. This methodology has been improved in terms of calculating the SPF, as has been reported in patents like U.S. Pat. No. 5,148,023, JP2001091355 and TW200819728.

Alternatively, "in vitro" methodologies have been developed based on two approaches: the first involves the measurement of absorption or transmission of UV radiation through layers of the product that provides the protection, which is applied on quartz or bio membrane plates. In the second, absorption characteristics of sunscreen agents are evaluated, determined by the spectrophotometric analysis of diluted solutions (Dutra et al., 2004).

The "in vitro" methodologies that have been developed (WO2008044596, TW200925580, WO2012125292, WO2013188320 and US2016025481, ISO 24444: 2010) for the assessment of the SPF, use substrates of polymethyl methacrylate (PMMA), which is not susceptible to UV radiation, whereby the effect is evaluated on the protection product that contains filters that react to radiation.

For the reasons set forth above, an alternative methodology "in vitro" is proposed. It evaluates the effect of UV radiation on skin constituents such as hyaluronic acid (HA) and its variation when a protective sample interferes with the radiation process solar (sun protection product). The HA can be used both in the form of thin film (solid state) and dispersion (liquid state).

The methodology is proposed to evaluate the photoprotection property that a product or ingredient offers in the design and development of sun protection products, thus contributing to technological advancement.

BRIEF DESCRIPTION OF THE INVENTION

There has been a great concern worldwide, not only because of the increase in skin cancer caused by solar radiation, but also because of the various questions that have been raised about the use of healthy volunteers exposed to radiation for determine the effectiveness of sunscreens. In this sense, it is important to develop alternative methodologies that allow an approach to the level of protection offered by the products with this purpose and thus facilitate their development and reduce the risk associated with the exposure of volunteers.

The proposed methodology is a useful tool for the alternative estimation of SPF from the evaluation of the effect of radiation on the degradation of HA as a study substrate. The "in vitro" methodology proposed, evaluates the effect of UV radiation on materials constituting the skin. The HA can be used both in the form of thin film (solid state) and dispersion (liquid state) in the equipment designed specifically for the method.

BRIEF DESCRIPTION OF THE FIGURES

FIG. 5 depicts the percentage of protection against UV radiation for different products on the market labeled with SPF 50.

DETAILED DESCRIPTION OF THE INVENTION

In this invention, tests have been carried out on four constituent materials of the skin that are susceptible to damage by UV radiation, namely: cholesterol, collagen, elastin and hyaluronic acid (HA). The latter is a glycosaminoglycan of natural origin consisting of a linear polymer of molecular weight of 50,000-13,000,000 daltons. It is a polysaccharide made from repeated units of glucuronic acid and N-acetyl-glucosamine, linked by alternating β1-3 and β1-4 bonds. The HA used in this invention and which we will call substrate, was purchased from a commercial source and corresponds to a fine powder, white and characteristic odor with molecular weight within the range described above.

Thanks to the physicochemical and film-forming characteristics of the HA it was possible to obtain the substrate in two states at the same concentration: liquid as a translucent and slightly viscous aqueous dispersion, and solid as a transparent thin film. Both states are susceptible to radiation.

For the preparation of the substrate in the liquid state, an aqueous dispersion is prepared with a concentration lower than 1% w/v HA (which is related to the amount of HA present in the skin, the response to radiation and the handling of the material), at a temperature between 17 and 21° C. and agitation in a range of 1200 to 1500 rpm for about 1 hour. For the solid state, with the described preparation, a shedding is made on a polystyrene mold with dimensions of 1.6×1.1 cm and by the casting method, drying for about 3 hours at a temperature between 45-55° C. Subsequently, the films are removed from the molds and stored at a temperature between 17 and 21° C. and a relative humidity between 18 and 22% until its later use.

Figure 1:
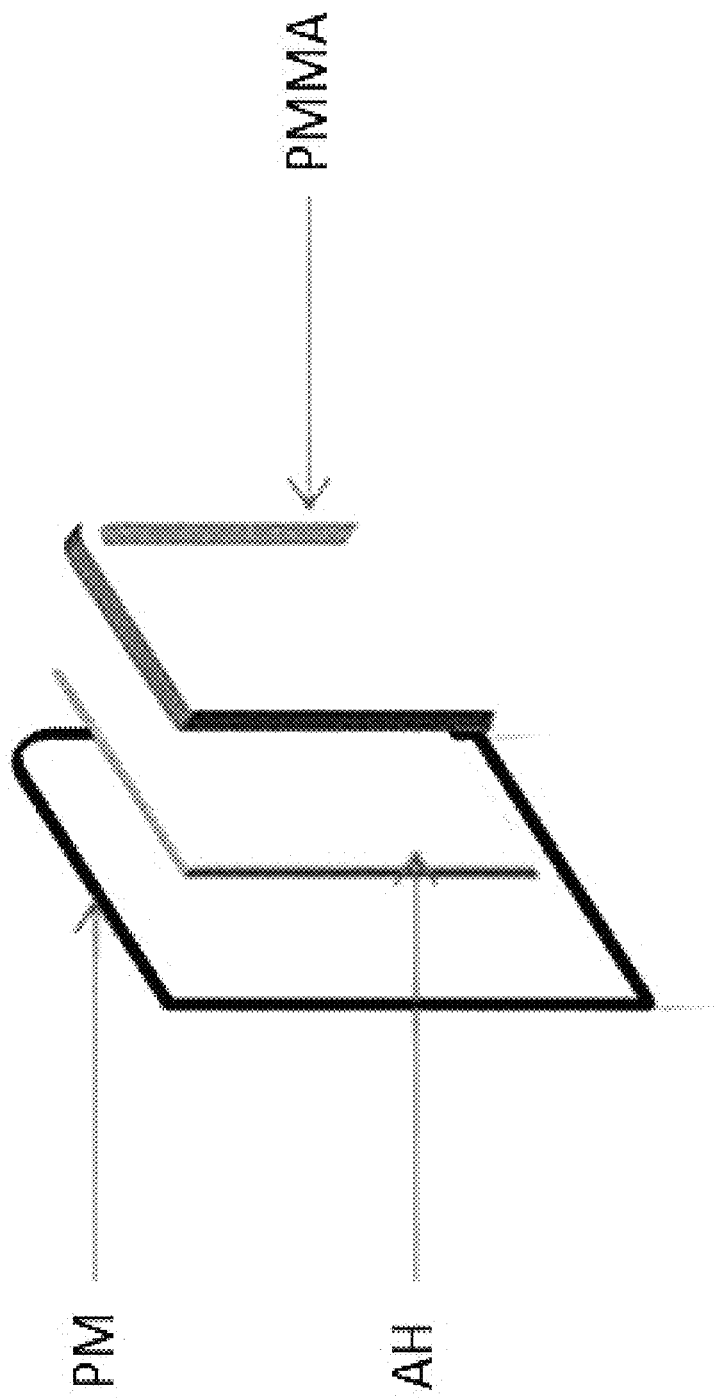
FIG. 1 depicts the assembly of the evaluation system for thin film consisting of: a sample holder (PM) that allows placing a thin film of HA, a film of support for the sample in polymethylmethacrylate (PMMA), material inert to radiation.

The assembly for the evaluation of the substrate in the solid state (FIG. 1) consists of a thin film of HA at the base of the sample holder (PM). On top of it a polymethylmethacrylate (PMMA) inert to the radiation thin support film is placed; on the latter, the product that is going to be evaluated as a protector for HA against UV radiation is homogeneously applied.

Figure 2:
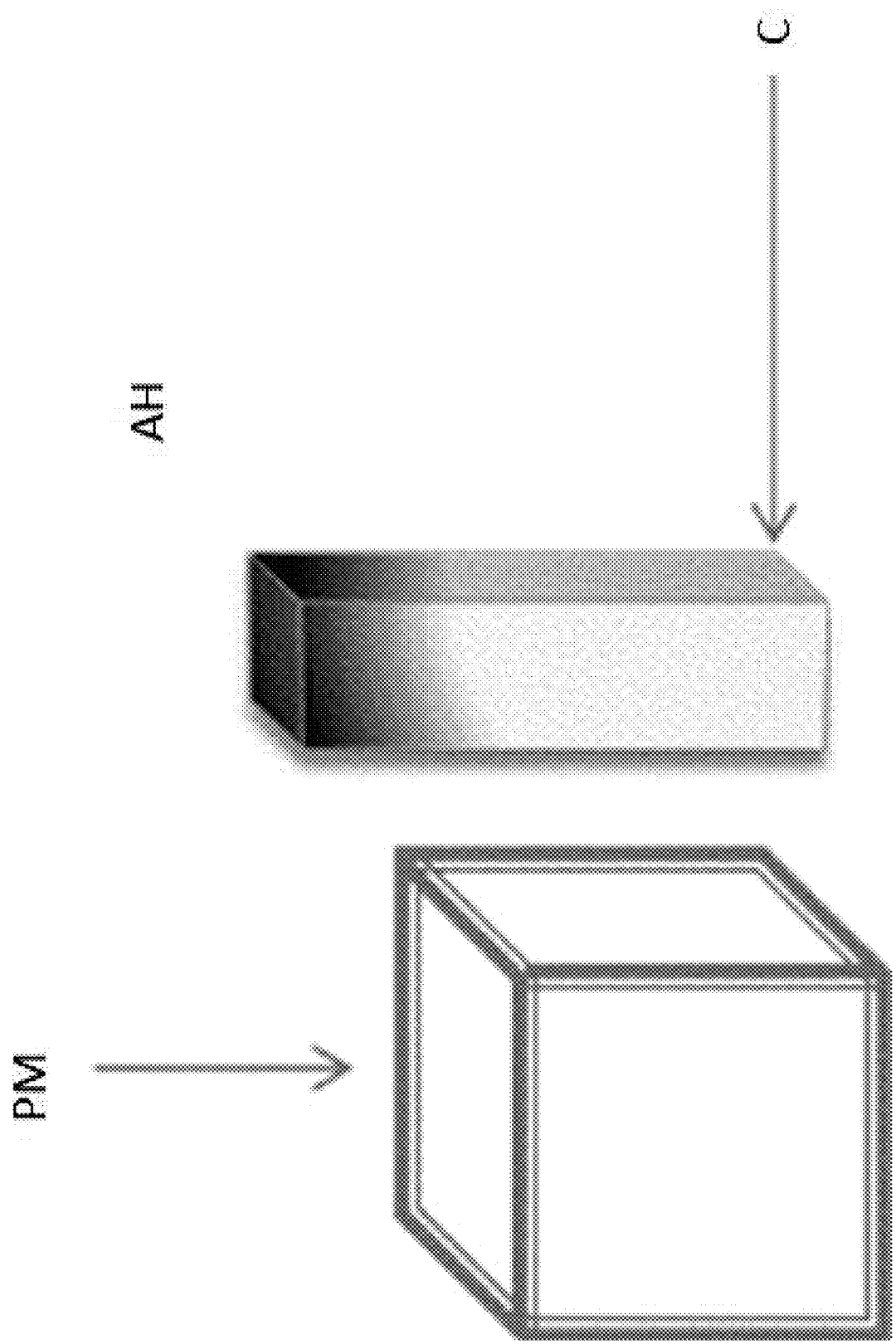
FIG. 2 depicts the assembly of the evaluation system for aqueous dispersion consisting of: a sample holder (PM) for the dispersion of HA which goes inside a quartz cell (C). One of the sides of C is used as a support to apply homogeneously the sample to be evaluated.

The second assembly refers to the evaluation of the substrate in the liquid state (FIG. 2), which consists of using directly the dispersion of HA incorporated within a standard quartz cell, material that is transparent to UV radiation and therefore it is used as a support to apply homogeneously the product that will serve as a protector for HA.

Both assemblies allow to be exposed to UV radiation conditions controlled in terms of time and type of radiation, since during the research it was possible to define that the degradation of the HA is dependent on the wavelength at which it is exposed and on the exposure time. Once the exposure of the assemblies to UV radiation is finished, the effect of the radiation on the HA is evaluated by verifying its transmittance in the UV range of the electromagnetic spectrum. For this, both the thin film and the aqueous dispersion can be used, taking into account that they behave in the same way in front of the radiation and that the sample holder of the apparatus allows the use of one or the other indistinctly.

Figure 3:
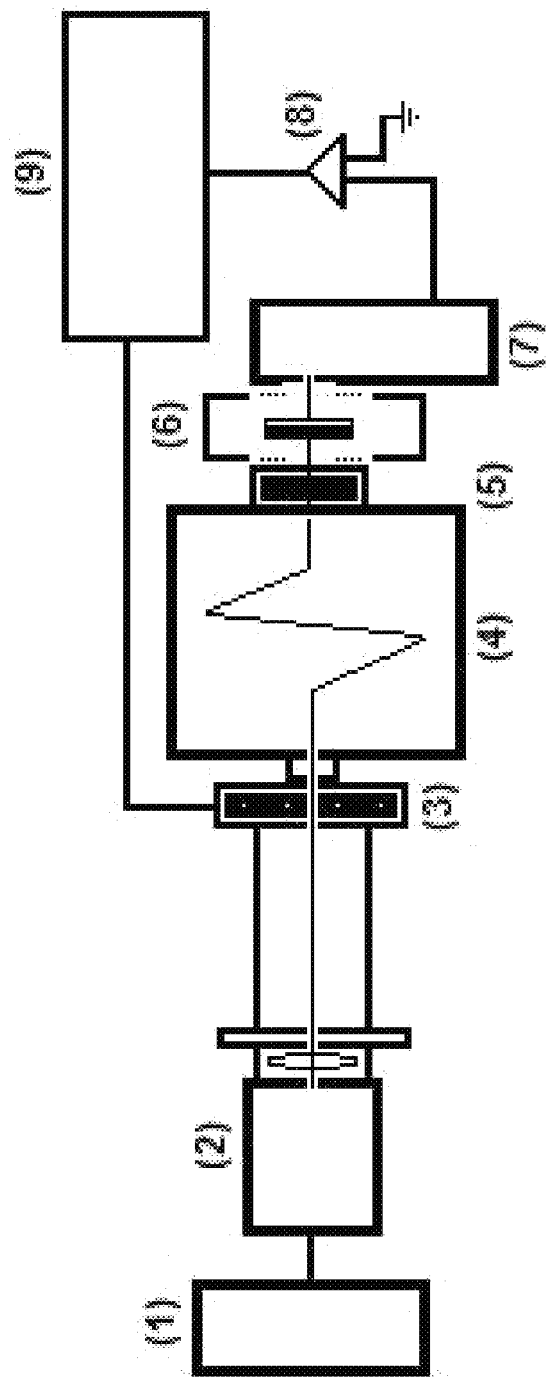
FIG. 3 details the optical system for measuring the effect of radiation on transmittance parameters
Figure 4:
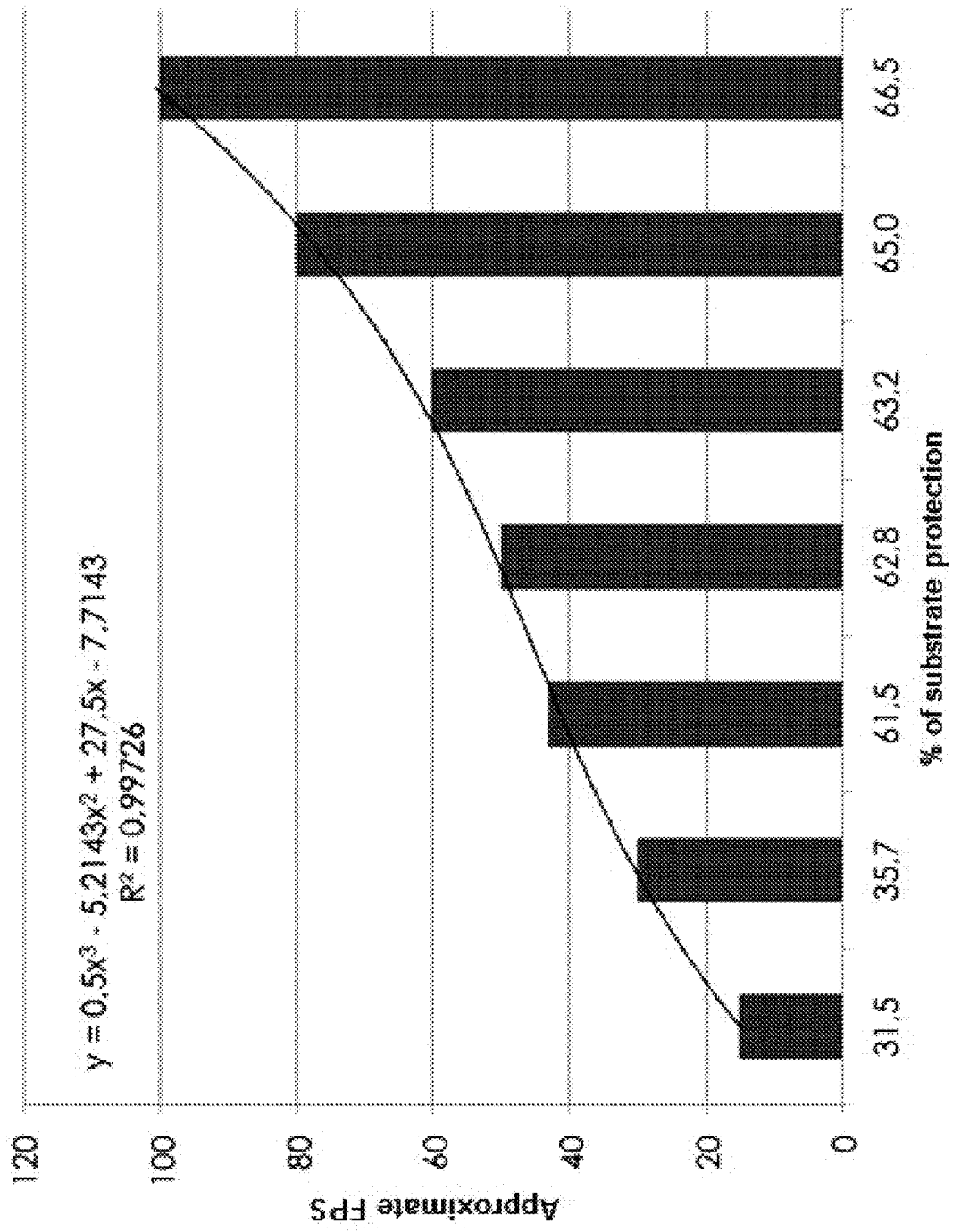
FIG. 4 depicts the graph of the correlation model between the percentages (%) of protection to HA and its correspondence in SPF.

The transmittance measurements of the HA are made using the optical system shown in FIG. 3. Normal incidence of the light beam is used for the range of wavelengths between 200-400 nm. A voltage source (1) enables the lamp or source of UV radiation (2) to be switched on. The light coming from the lamp (2) reaches the monochromator (4). Before the light reaches the monochromator (4) it is passed through the chopper or stroboscope (3), which pulses the light at a certain frequency and is controlled by the Lock-in amplifier (9). In the monochromator (4), the light it decomposes in its fundamental wavelengths and a monochromatic light pass through a slit (5), to finally incline perpendicularly on the surface of the film or the cell respectively. The assembly is placed in the sample holder (6), so that the light transmitted by it is collected in the detector (7). The output signal (after detector) is amplified in the preamplifier (8) and analyzed by the Lock-in amplifier (9).

The sample holder (6) is interchangeable and for this reason it allows to measure the intensity of the transmitted light for both assemblies (thin film and dispersion).

The methodology is framed in the determination of an estimated value of SPF through a mathematical correlation between the SPF value "in vivo" of each product and a percentage of protection to the HA offered by said products. The method includes the following features:

1) Characterization of physical properties of both PMMA support and HA (solid and liquid states) in terms of thickness, roughness, density, stability against oily and aqueous media.

2) Definition of the test characteristics: Exposure wavelength and exposure time. Standardization of the method of application of the reference formulations and test on the support—substrate assembly taking into account quantity per unit area, application form, application pressure, drying time, radiation time, period between the time of exposure to radiation and spectrophotometric measurement.

3) Evaluation of the effect of the radiation on the HA in terms of percent degradation to the conditions described in order to obtain a reference of the maximum degree of degradation.

4) Use of the products to be evaluated and calculation in terms of percentage of protection with respect to the obtained reference, to determine the ability of these sunscreens to avoid the degradation of the HA, that is, how much they prevent degradation from the maximum reached.

Under the described conditions, the maximum degradation reached by the HA without any type of protection is greater than 30%, a value used as a reference for calculating the percentage of protection offered by sun protection products.

To validate the proposed methodology, a series of tests were carried out that proved the behavior of the HA against radiation, depending on the concentration of sunscreens and standardization of the test conditions in terms of time exposure and application of the product. Two standard filters reported by the literature were used separately (one of physical barrier type and another chemical), transported in a w/o type emulsion system at progressive concentrations to evaluate the response of the method at the evaluation conditions. Homosalate was used as a chemical filter in concentrations from 2 to 20% and titanium dioxide was used as a physical filter in concentrations from 2 to 15%. A polynomial correlation model of order 3 of protection values for HA was established as a function of the corresponding filter concentration for both cases. Likewise, reproducibility was found in the determinations and adequate precision with coefficients of variation lower than 3%.

Once the response of the method to the study conditions was established, different solar protection products marketed whose labeling reported SPF values between 15 and 100 were evaluated. After the determinations and by means of a statistical analysis, the correlation model was established for the protection percentage of the HA based on the labeled SPF, finding that it responds to a polynomial function of order 3 with a coefficient of determination $R^2=0.9$.

One of the main determinations for the validation of the methodology was the evaluation of the repeatability and the intermediate precision, which was established for products with low, medium and high SPF with intraday and interday measurements, obtaining coefficients of variation lower to 4.5%.

Finally, a correlation model was established between the protection levels reached for the HA and the SPF values to which said protection corresponds.

EXAMPLE

Once the correlation model between the protection percentage of the HA and its correspondence in SPF was established, a determination of the estimated SPF for 7 products on the market labeled with SPF 50 was accomplished. For the test, an aqueous dispersion of HA was used at 0.7% w/v and therefore the homogeneous application of the products was carried out on the quartz surface of a standard cell, corresponding to 1 mg/cm$^2$ following the provisions of ISO 24444:2010 "in vivo determination of the sun protection factor (SPF)". Once the product was dried, exposure to UV radiation was carried out controlling the wavelength and exposure time. The evaluation was carried out in triplicate with a coefficient of variation of less than 3.5%.

Once the data was obtained, the calculation of the percentage of degradation of the HA in each case was executed, and against the maximum degradation (without any applied product) the percentage of protection was calculated, finding that values between 60 and 75% were reached as it is observed in FIG. 5. When using the mathematical model developed in the methodology, it was found that the estimated SPF corresponds to values higher than 50, acceptable results and concordant with the expected for the proposed methodology.

LITERATURE REFERENCES

Bailón Moreno, R. Chiadmi, L. The New In Vitro Method of Zein and its Correlation with Loss of Transepidermal Water. Edited: Rafael Bailón Moreno. 2007
Dutra, E. A., Oliveira, D. A. G. D. C, Kedor-Hackmann, E. R. M., & Santoro, M. R. M. (2004). Determination of sun protection factor (SPF) of sunscreens by ultraviolet spectrophotometry. Brazilian Journal of Pharmaceutical Sciences, 40 (3), 381-385.
Naylor, E. C, Watson, R E, & Sherratt, M J (2011). Molecular aspects of skin geing. Maturitas, 69 (3), 249-256. 7] Schalka, S., & Reis, VMSD (2011). Sun protection factor: meaning and controversies. Anais brasileiros de dermatologia, 86 (3), 507-515.

PATENT REFERENCES

U.S. Pat. No. 5,148,023
JP2001091355
TW200819728
WO2008044596
TW200925580
WO2012125292
WO2013188320
US2016025481

All patents, patent applications and publications cited in this application including all cited references in those patents, applications and publications, are hereby incorporated by reference in their entirety for all purposes to the same extent as if each individual patent, patent application or publication were so individually denoted.

While the many embodiments of the invention have been disclosed above and include presently preferred embodiments, many other embodiments and variations are possible within the scope of the present disclosure and in the appended claims that follow. Accordingly, the details of the preferred embodiments and examples provided are not to be construed as limiting. It is to be understood that the terms used herein are merely descriptive rather than limiting and that various changes, numerous equivalents may be made without departing from the spirit or scope of the claimed invention.

What is claimed is:
1. An in vitro method for the determination of the sun protection factor (SPF) of a substance, comprising the following steps:
(a) forming a hyaluronic acid substrate by providing a hyaluronic acid either as a natural liquid substrate or as a solid substrate, wherein when in liquid form said hyaluronic acid is present in concentrations between 0.2% w/v and 1% w/v;
(b) providing a UV spectrophotometer;
(c) applying said substance whose SPF is being determined into a sample holder containing said hyaluronic acid substrate;
(d) projecting UV radiation through a monochromator perpendicularly over the sample and the hyaluronic acid substrate using the UV spectrophotometer;
(e) measuring the percentage degradation of hyaluronic acid by determining its transmittance in the UV range in regard to the maximum degree of degradation at the test conditions; and
(d) repeating the previous procedure for another sample whose SPF is to be determined.

2. The method for the determination of sun protection factor (SPF) according to claim 1, wherein the natural liquid hyaluronic acid substrate is in the form of an aqueous dispersion.

3. The method for the determination of sun protection factor (SPF) according to claim 1, wherein the hyaluronic acid used as a solid substrate is formed by casting the hyaluronic acid as a film having a thickness between 0.1 mm and 0.3 mm.

4. The method for the determination of the sun protection factor (SPF) of a substance according to claim 1, further comprising adding up to 3 ml of the liquid substrate into a quartz cell sample holder having a volume capacity of 5 ml and on the surface of said liquid substrate that is in the path of the monochromator adding the amount of 1 mg/cm$^2$ of the substance whose SPF is being determined following the provisions of ISO 24444: 2010.

5. The method for the determination of the sun protection factor (SPF) of a substance according to claim 1, wherein the sample of the substance whose SPF is being determined is applied to the hyaluronic acid solid substrate supported by a polymethylmethacrylate plate in the amount of 1 mg/cm$^2$, wherein said solid substrate is mounted on a sample holder (P), and wherein said sample is evaluated in accordance with the provisions of ISO 24444: 2010.

6. The method for the determination of the sun protection factor (SPF) of a substance according to claim 1, wherein the wavelengths of the projected UV radiation are in the range between 200-400 nm.

7. The method for the determination of the Sun protection factor (SPF) of a substance according to claim 2, wherein the wavelengths of the projected UV radiation are in the range between 200-400 nm.

8. The method for the determination of the Sun protection factor (SPF) of a substance according to claim 3, wherein the wavelengths of the projected UV radiation incident light within the optical system are in the range between 200-400 nm.

9. The method for the determination of the Sun protection factor (SPF) of a substance according to claim 4, wherein the wavelengths of the projected UV radiation are in the range between 200-400 nm.

* * * * *